(12) United States Patent
Pehlke et al.

(10) Patent No.: US 10,944,523 B2
(45) Date of Patent: *Mar. 9, 2021

(54) UPLINK CARRIER AGGREGATION ARCHITECTURE

(71) Applicant: SKYWORKS SOLUTIONS, INC., Woburn, MA (US)

(72) Inventors: David Richard Pehlke, Westlake Village, CA (US); John Chi-Shuen Leung, Foothill Ranch, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,290

(22) Filed: Oct. 7, 2019

(65) Prior Publication Data
US 2020/0162209 A1 May 21, 2020

Related U.S. Application Data

(63) Continuation of application No. 15/233,903, filed on Aug. 10, 2016, now Pat. No. 10,447,442.

(60) Provisional application No. 62/203,396, filed on Aug. 11, 2015.

(51) Int. Cl.
*H04L 5/00* (2006.01)
*H04B 7/0413* (2017.01)

(52) U.S. Cl.
CPC .......... *H04L 5/001* (2013.01); *H04B 7/0413* (2013.01); *H04L 5/0023* (2013.01)

(58) Field of Classification Search
CPC ........................ H04L 5/001; H05B 7/0413
See application file for complete search history.

(56) References Cited

U.S. PATENT DOCUMENTS

| 9,312,888 B2 * | 4/2016 | Weissman | H04B 7/0404 |
| 2015/0065058 A1 * | 3/2015 | Wang | H04B 15/00 455/63.1 |

* cited by examiner

*Primary Examiner* — Tuan H Nguyen
(74) *Attorney, Agent, or Firm* — Chang & Hale LLP

(57) ABSTRACT

Uplink carrier aggregation architecture. In some embodiments, an uplink (UL) carrier aggregation (CA) architecture may include a first antenna port and a second antenna port. The UL CA architecture may also include a first radio-frequency (RF) circuit configured to route a first transmit (TX) signal and a first receive (RX) signal to and from the first antenna port, respectively, the first RF circuit further configured to route a second RX signal from the first antenna port. The UL CA architecture may further include a second RF circuit configured to route a second TX signal to the second antenna port to provide UL CA capability between the first and second TX signals.

19 Claims, 8 Drawing Sheets

UPLINK CARRIER AGGREGATION ARCHITECTURE

CROSS-REFERENCE TO RELATED APPLICATIONS

This application is a continuation of U.S. patent application Ser. No. 15/233,903, filed Aug. 10, 2016, entitled "UPLINK CARRIER AGGREGATION ARCHITECTURE," which claims priority to U.S. Provisional Application No. 62/203,396, filed Aug. 11, 2015, entitled "UPLINK CARRIER AGGREGATION ARCHITECTURE," the disclosure of each of which is hereby expressly incorporated by reference herein in its respective entirety.

BACKGROUND

Field

The present disclosure relates to carrier aggregation. In particular, the present disclosure relates to an uplink (UL) carrier aggregation (CA) system.

Description of Related Art

In some wireless communication systems, such as Long Term Evolution-Advanced (LTE-Advanced), it may be desirable to support simultaneous transmitters being active at the same time. Supporting simultaneous active transmitters (at the same time) may allow for added features and capabilities such as simultaneous radio operation in a user equipment (UE). Relatively high power signals from two or more transmit (TX) carriers being routed and/or processed at or near a front-end may be a challenge. For example, various blocks in the TX and receive (RX) paths may be somewhat nonlinear, and accordingly, intermodulation products at a range of frequencies may be created.

SUMMARY

In some implementations, the present disclosure relates to an uplink (UL) carrier aggregation (CA) architecture. The UL CA architecture includes a first antenna port and a second antenna port. The UL CA architecture also includes a first radio-frequency (RF) circuit configured to route a first transmit (TX) signal and a first receive (RX) signal to and from the first antenna port, respectively, the first RF circuit further configured to route a second RX signal from the first antenna port. The UL CA architecture further includes a second RF circuit configured to route a second TX signal to the second antenna port to provide UL CA capability between the first and second TX signals.

In some embodiments, wherein the first and second RX signals being separated by the first and second RF circuits reduces an effect of an intermodulation distortion (IMD) on the second RX signal.

In some embodiments, wherein the IMD is a third-order IMD (IMD3).

In some embodiments, the IMD3 results from intermodulation of the first and second TX signals.

In some embodiments, the second TX signal has a frequency that is higher than the first TX signal.

In some embodiments, the IMD3 is at a frequency higher than the frequency of the second TX signal.

In some embodiments, the first TX signal and the first RX signal are parts of a first cellular band, and the second TX signal and the second RX signal are parts of a second cellular band.

In some embodiments, the first cellular band includes B3.

In some embodiments, the second cellular band includes B1.

In some embodiments, the first RF circuit includes a first TX path having a power amplifier (PA), a duplexer coupled to an output of the PA, and a switchable path between the duplexer and the first antenna port.

In some embodiments, the first RF circuit further includes a first RX path configured to process the first RX signal, the first RX path including a switchable path between the first antenna port and the duplexer of the first TX path.

In some embodiments, the switchable path of the first RX path includes the switchable path of the first TX path.

In some embodiments, the first RF circuit further includes a second RX path configured to process the second RX signal, the second RX path including a switchable path between the first antenna path and a filter.

In some embodiments, the switchable path of the first RX path and the switchable path of the second RX path include respective switches implemented in an antenna switch module (ASM).

In some embodiments, the second RF circuit includes a second TX path having a PA, a filter coupled to an output of the PA, and a switchable path between the filter and the second antenna port.

In some embodiments, the switchable path of the second TX path includes a switch in an antenna switch module (ASM).

In some implementations, the present disclosure relates to a method for performing uplink (UL) carrier aggregation (CA). The method includes providing a first antenna port and a second antenna port. The method also includes processing a first transmit (TX) signal and a first receive (RX) signal to and from the first antenna port, respectively. The method further includes routing a second RX signal from the first antenna port. The method further includes routing a second TX signal to the second antenna port to provide UL CA capability between the first and second TX signals.

In some implementations, the present disclosure relates to a radio-frequency (RF) module. The RF module includes a packaging substrate configured to receive one or more components. The RF module also includes an uplink (UL) carrier aggregation (CA) system implemented on the packaging substrate, the UL CA system including a first antenna port and a second antenna port, the UL CA system further including a first RF circuit configured to route a first transmit (TX) signal and a first receive (RX) signal to and from the first antenna port, respectively, the first RF circuit further configured to route a second RX signal from the first antenna port, the UL CA system further including a second RF circuit configured to route a second TX signal to the second antenna port to provide UL CA capability between the first and second TX signals.

In some embodiments, the RF module is a front-end module (FEM).

In some embodiments, the first RF circuit is implemented on a first module, and the second RF circuit is implemented on a second module.

In some embodiments, each of the first and second modules includes an antenna switch module (ASM) configured to route the first and second TX signals.

In some embodiments, the first RF circuit and the second RF circuit are implemented on a common module.

In some embodiments, the RF module further includes a diplexer configured to facilitate processing of the first and second RX signals by the first RF circuit.

In some implementations, the present disclosure relates to a wireless device. The wireless device includes a transceiver configured to process radio-frequency (RF) signals. The wireless device also includes a first antenna and a second antenna, each in communication with the transceiver. The wireless device further includes an uplink (UL) carrier aggregation (CA) system implemented between the transceiver and the first and second antennas, the UL CA system including a first RF circuit configured to route a first transmit (TX) signal and a first receive (RX) signal to and from the first antenna, respectively, the first RF circuit further configured to route a second RX signal from the first antenna, the UL CA system further including a second RF circuit configured to route a second TX signal to the second antenna to provide UL CA capability between the first and second TX signals.

In some embodiments, the first antenna is a primary antenna, and the second antenna is a UL CA antenna.

In some embodiments, the wireless device is a cellular phone.

In some embodiments, the cellular phone is capable of operating in B3 and B1 bands.

DETAILED DESCRIPTION OF SOME EMBODIMENTS

The headings provided herein, if any, are for convenience only and do not necessarily affect the scope or meaning of the claimed invention.

Figure 1:
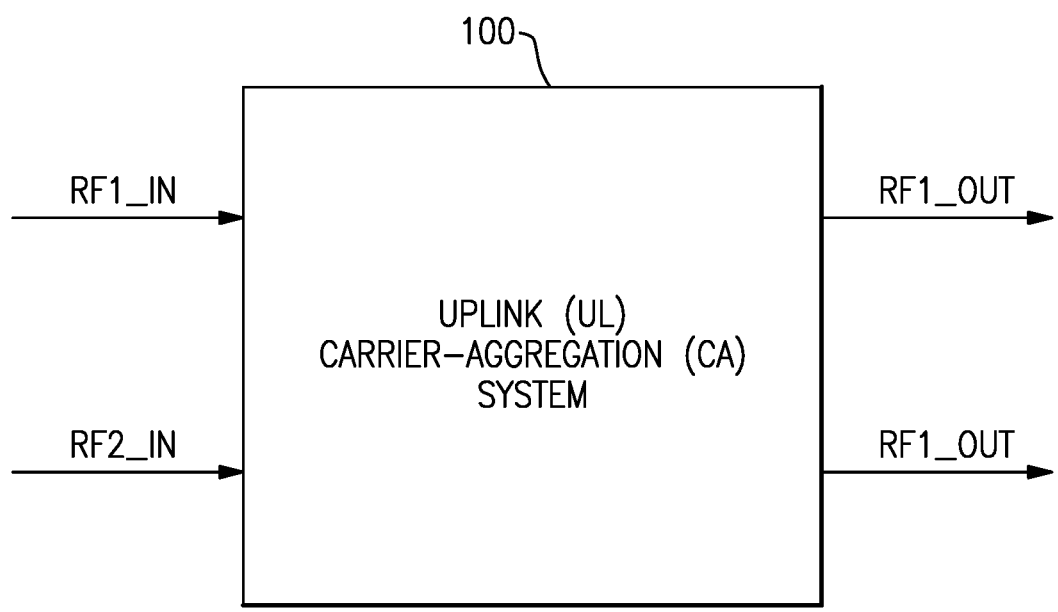
FIG. 1 illustrates an example uplink (UL) carrier aggregation (CA) system, in accordance with some embodiments of the present disclosure.

Described herein are various examples of uplink (UL) carrier aggregation (CA) architectures, devices and methods having in proved performance such as reduced intermodulation impairments. FIG. 1 shows a block diagram of a UL CA system 100 having one or more advantageous features as described herein. Such a UL CA system can be configured to process a plurality of radio-frequency (RF) signals (RF1_IN, RF2_IN) and route them to a plurality of antennas or antenna feeds as output signals RF1_OUT, RF2_OUT.

It is noted that in wireless communication systems such as LTE-Advanced, added features and capabilities such as simultaneous radio operation in a user equipment (UE) make it necessary or desirable to support simultaneous transmitters being active at the same time. Relatively high power signals from two or more transmit (TX) carriers being routed and/or processed at or near a front-end can be a challenge. For example, various blocks in the TX and receive (RX) paths are somewhat nonlinear, and accordingly, intermodulation products at a range of frequencies can be created.

Figure 2:
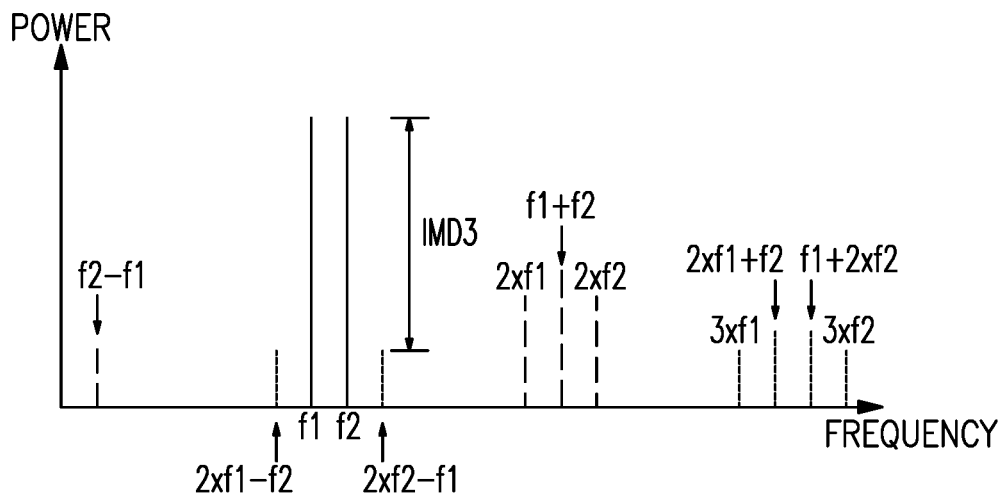
FIG. 2 illustrates examples of intermodulation (IM) products that can arise from different signals having respective frequencies, in accordance with some embodiments of the present disclosure.

FIG. 2 shows examples of intermodulation (IM) products that can arise from first and second signals having respective frequencies f1 and f2. Second-order IM products can include, for example, power peaks at $f1+f2$, $f2-f1$, $2 \times f1$, and $2 \times f2$. Third-order IM products can include, for example, power peaks at $3 \times f1$, $3 \times f2$, $2 \times f1+f2$, $f1+2 \times f2$, $2 \times f1-f2$, and $2 \times f2-f1$. In many applications, the last two third-order IM products ($2 \times f1-f2$, and $2 \times f2-f1$) can pose problems due to their close proximity to the fundamental signal frequencies f1 and f2. Accordingly, an IMD3 (third-order intermodulation distortion) is typically defined as shown, or in some similar manner.

Figure 3:
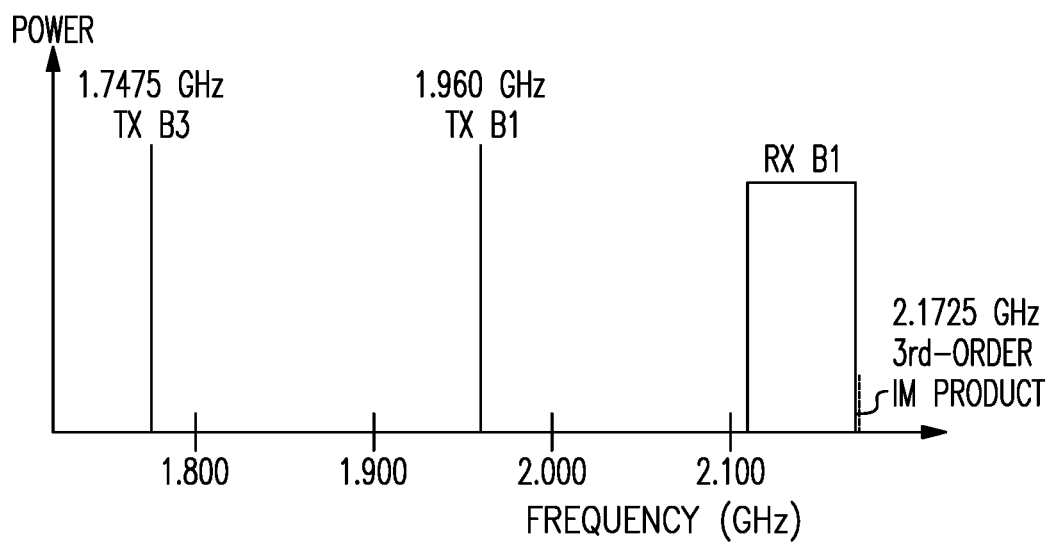
FIG. 3 illustrates examples of a third-order IM product involving two example frequencies associated with cellular frequency bands, in accordance with some embodiments of the present disclosure.

FIG. 3 shows examples of a third-order IM product involving two example frequencies associated with cellular frequency bands. It is noted that the TX portion of Band 3 (B3 TX) has a frequency range of 1.710 GHz to 1.785 GHz, and the TX portion of Band 1 (B1 TX) has a frequency range of 1.920 GHz to 1.980 GHz. Accordingly, suppose that two TX signals at the mid-frequencies (1.7475 GHz, 1.960 GHz) of the two TX bands are being processed simultaneously, such as in an UL CA application. Such two frequencies can generate, among others, a third-order IM product at approximately 2.1725 GHz (from $2 \times 1.960 - 1.7475$) as shown.

It is further noted that the RX portion of Band 1 (B1 RX) has a frequency range of 2.110 GHz to 2.170 GHz. Such a range is depicted in FIG. 3 as "RX B1." One can see that the third-order IM product at 2.1725 GHz (which results from the mid-band frequencies) is just above the upper limit of B1 RX. Thus, intermodulation between B3 TX and B1 TX can result in a third-order IM product in a frequency range that overlaps at least partially with the B1 RX frequency range. Accordingly, performance associated with B1 RX operation can suffer due to such an IM product resulting from relatively high-powered TX signals.

Some solutions that can address the foregoing problem can include, for example, filtering of the separate TX carriers at significant penalty in insertion loss for the affected paths. In another example, each transmit band can be provided with its own dedicated antenna, and thereby leverage the associated benefit of antenna-to-antenna isolation. However, isolating two TX carriers such that the nonlinear IM products are not created, or are at insignificant levels, is not always possible due to limited space, expense, and/or constraints on the tolerable loss associated with sufficient filtering.

In some wireless applications, an UL CA configuration can include a first antenna configured to facilitate TX and RX operations associated with a first band, and a second antenna configured to facilitate TX and RX operations associated with a second band. Suppose that intermodulation between TX portions of the first and second bands results in an IM product (e.g., a third-order IM product) that overlaps with or is sufficiently close to an RX portion of the first or second bands so as to create problems for such an RX band.

For the purpose of description, such an RX band or frequency can be referred to as a "victim" band or frequency. For the purpose of description, an IM product and the resulting distortion can be referred to as IMD3 since the third-order IM product is typically the most problematic. However, and as described herein, other order IM products overlapping with an RX or TX band can be addressed utilizing one or more features as described herein.

In the foregoing example, there are two sources of IMD3 in the first antenna. The first source includes the TX chain associated with the first antenna, and the second source includes leakage from the TX chain associated with the second antenna (through a finite antenna-to-antenna isolation). Similarly, there are two sources of IMD3 in the second antenna. The first source includes the TX chain associated with the second antenna, and the second source includes leakage from the TX chain associated with the first antenna (through a finite antenna-to-antenna isolation).

For the purpose of description, a TX band or frequency that impacts a victim band or frequency the most or in some other manner can be referred to as an "offending" band or frequency. In the foregoing example, suppose that the RX band of the second band is a victim band. Then, the TX band of the second band can be an offending band due to, for example, its stronger presence and closer proximity in frequency relative to the victim RX band. Such a stronger presence can be due to, for example, the TX band of the second band being closer to the offending IMD3, and therefore being multiplied by 2.

Figure 4:
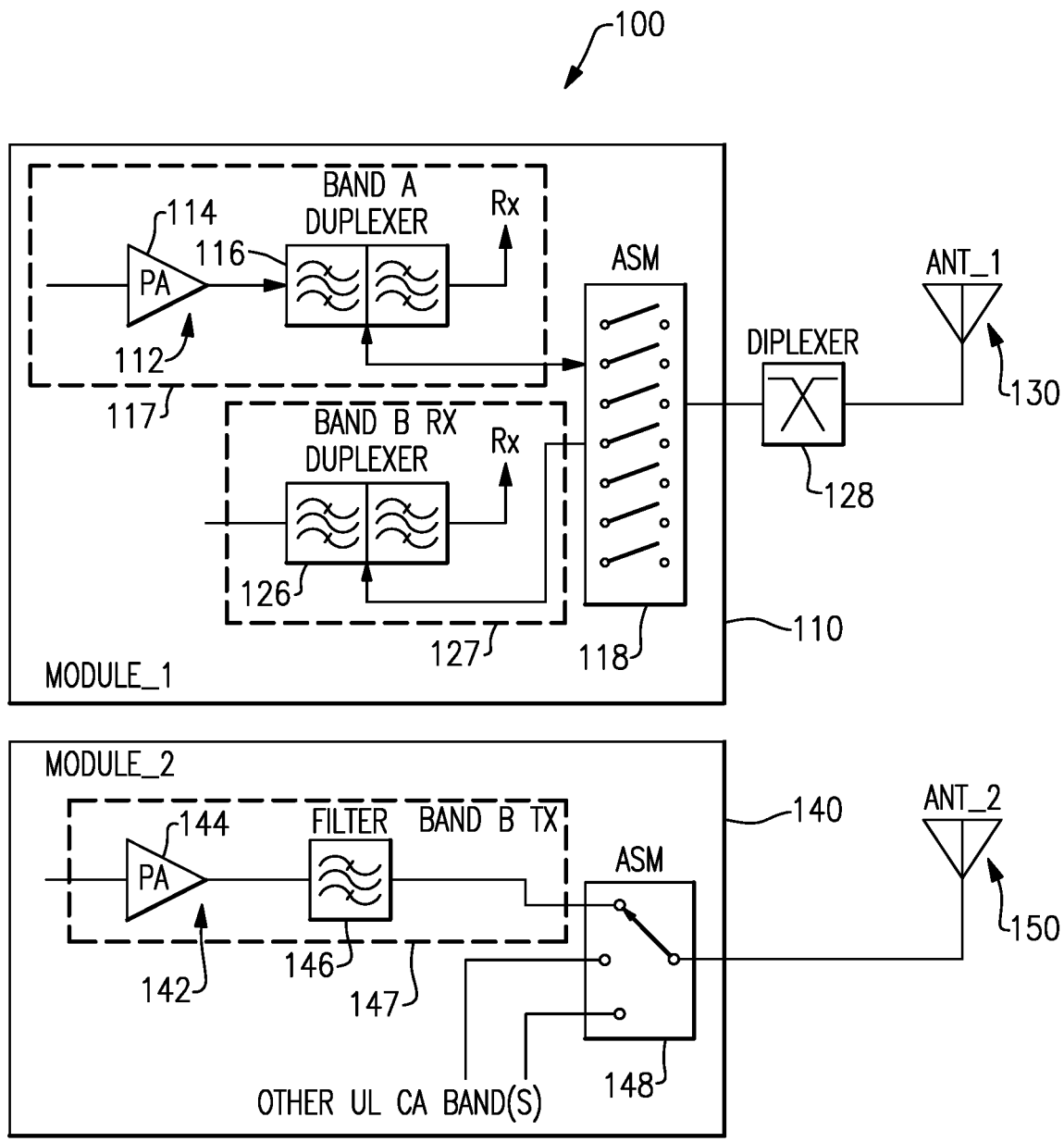
FIG. 4 illustrates an example UL CA system configured to provide UL CA functionality for a first band and a second band, in accordance with some embodiments of the present disclosure.

FIG. 4 shows an example of an UL CA system 100 configured to provide UL CA functionality for a first band (Band A) and a second band (Band B). TX operation associated with the first band is shown to be facilitated by a first antenna (ANT_1) 130, and TX operation associated with the second band is shown to be facilitated by a second antenna (ANT_2) 150.

In the example of FIG. 4, RX operation associated with the first band is shown to be facilitated by the first antenna 130. Accordingly, a duplex configuration indicated as 117 can include a duplexer 116 configured to filter a first amplified RF signal from a PA 114 of an amplification path 112 and route it to the first antenna 130 through an antenna switch module (ASM) 118. The duplexer 116 can be further configured to filter a first RX signal received from the first antenna 130 and route it to an RX circuit (indicated as an "Rx" path) for further processing.

FIG. 4 shows that in some embodiments, TX and RX paths associated with a given band can be separated such that its TX operation is performed through one antenna, and its RX operation is performed through another antenna. In the example of FIG. 4, TX operation associated with the second band (Band B) is shown to be performed through the second antenna 150, and RX operation associated with the second band (Band B) is shown to be performed through the first antenna 130.

In the example of FIG. 4, the foregoing TX operation of the second band can include a TX path 147 through which a second amplified RF signal from a PA 144 (of an amplification path 142) is passed through a filter 145 and routed to the second antenna 150 through an ASM 148. The foregoing RX operation of the second band can include an RX path 127 configured to receive a second RX signal from the first antenna 130 through the ASM 118. Such an RX signal can be passed through a filter or a duplexer 126 and be routed to an RX circuit (indicated as an "Rx" path) for further processing.

In the example of FIG. 4, the TX portion of the second band (Band B) can be an offending band, and the RX portion of the second band (Band B) can be a victim band. Accordingly, the TX and RX paths associated with the second band (Band B) can be separated, such that the TX operation is performed through the second antenna 150 and the RX operation is performed through the first antenna as described above.

In the example of FIG. 4, it is noted that a diplexer 128 can be provided between the first antenna 130 and the ASM 118 to, for example, facilitate simultaneous RX operations of the first and second bands through the first antenna 130. It is further noted that the ASM 118 associated with the first antenna 130 can include a combination of switching for TX/RX operations of the first band and switching for RX operation of the second band.

In the example of FIG. 4, the TX/RX functionalities of the first band and the RX functionality of the second band are shown to be implemented as a first module (Module_1) 110, and the TX functionality of the second band, as well as one or more UL CA functionalities, are shown to be implemented as a second module (Module_2) 140. It will be understood that other forms of functional and/or modular groupings are also possible.

Figure 5:
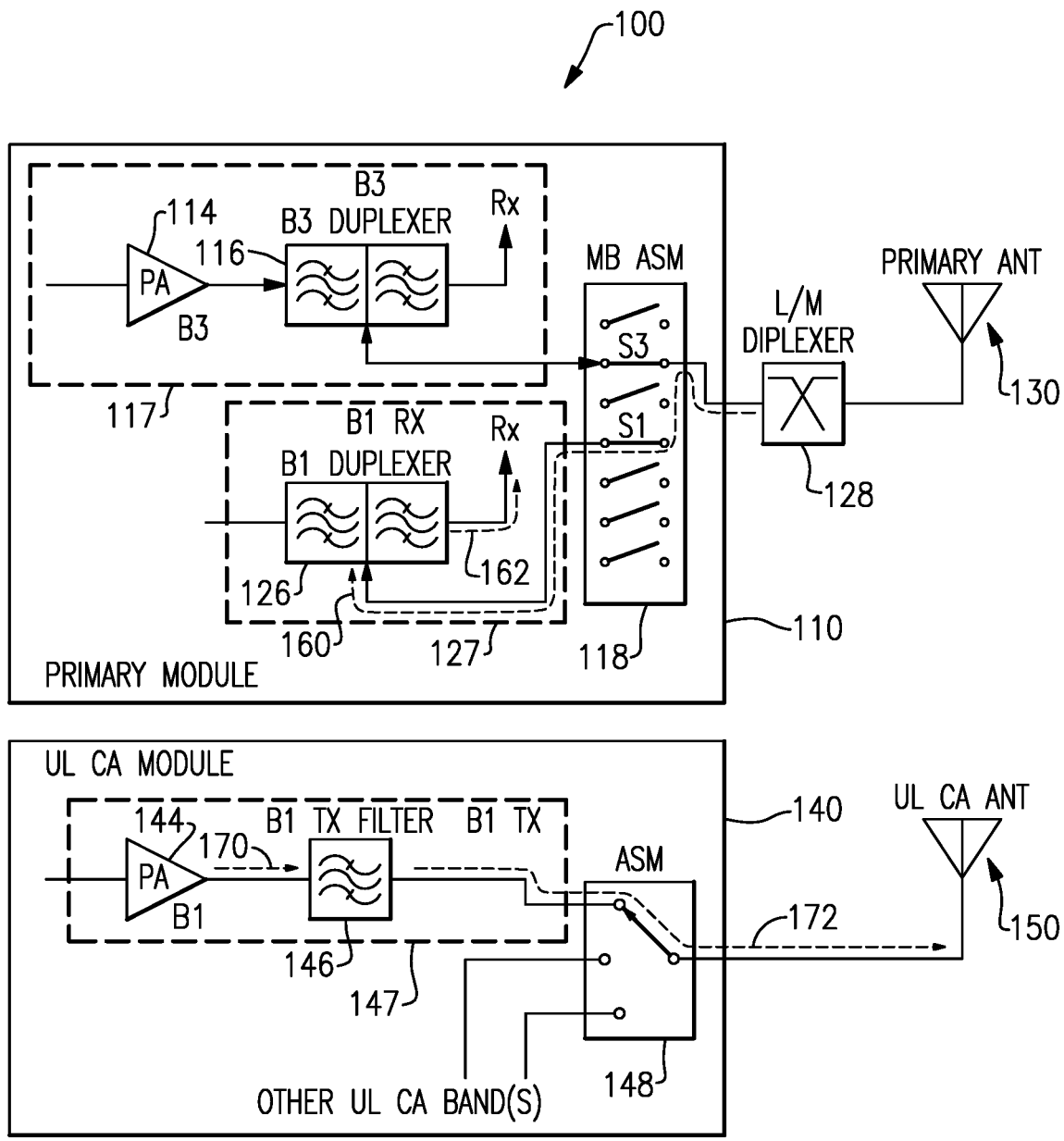
FIG. 5 illustrates an example UL CA system, in accordance with some embodiments of the present disclosure.

FIG. 5 shows a UL CA system 100 that can be a more specific example of the UL CA system 100 of FIG. 4. In the example of FIG. 5, the first band (Band A in FIG. 4) can be B3 having a TX frequency range of 1.710 GHz to 1.785 GHz, and an RX frequency range of 1.805 GHz to 1.880 GHz. The second band (Band B in FIG. 4) can be B1 having a TX frequency range of 1.920 GHz to 1.980 GHz, and an RX frequency range of 2.110 GHz to 2.170 GHz.

In the example of FIG. 5, various components associated with the duplex configuration 117, the RX path 127, and the TX path 147 can be generally similar to the example of FIG. 4 and configured to facilitate operations with the B3 and B1 bands. In some embodiments, the ASM 118 associated with the first antenna 130 can be configured to include mid-band (MB) functionality to accommodate the duplex operations of the B3 band and the RX operation of the B1 band. Similarly, the diplexer 128 can be configured as a low-band/mid-band diplexer to accommodate the RX operations of the B3 and B1 bands.

In the example of FIG. 5, the ASM 118 is shown to include a switch or a switching functionality depicted as S3 that provides a connection between the B3 duplexer 113 and the L/M diplexer 128, so as to facilitate the TX/RX duplex operations of the B3 band through the first antenna 130. The same ASM 118 is shown to include a switch or a switching functionality depicted as S1 that provides a connection between the B1 duplexer 126 and the L/M diplexer 128, so as to facilitate the RX operation of the B1 band through the first antenna 130. Routing of such an RX signal is depicted as 160. Further routing of the filtered output from the B1 duplexer 126 is depicted as 162.

In the example of FIG. 5, the ASM 148 is shown to include a switch or a switching functionality as shown to provide a connection between the B1 TX filter 146 and the second antenna 150, so as to facilitate the TX operation of the B1 band through the first antenna 150. Routing of such a TX signal is depicted as 172. Routing of the amplified B1 TX signal between the PA 144 and the B1 TX filter 146 is depicted as 170.

Figure 6:
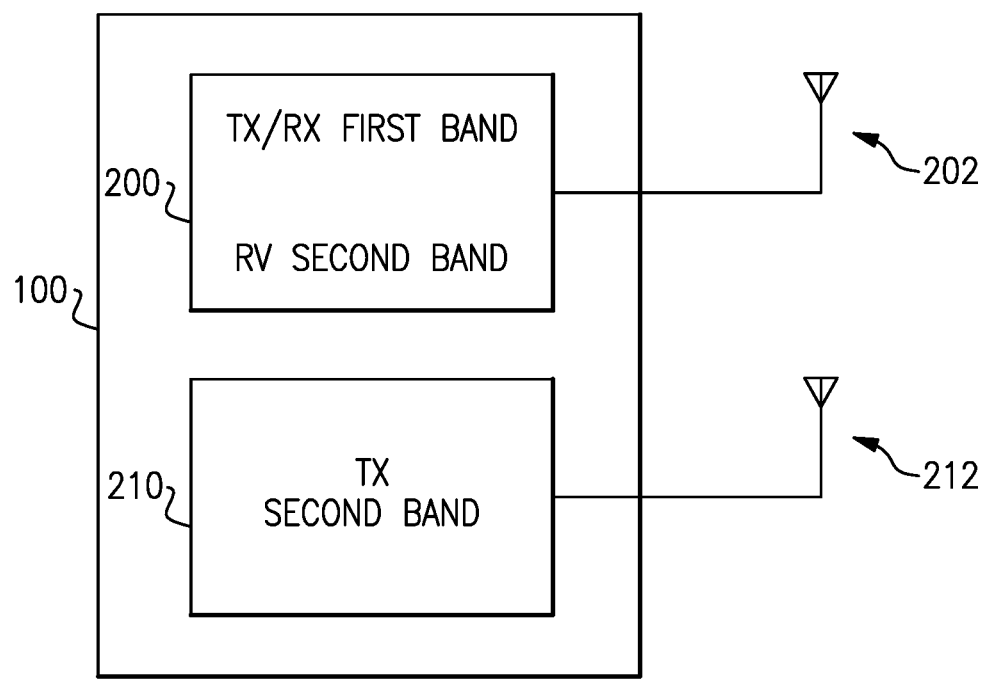
FIG. 6 illustrates an example UL CA system, in accordance with some embodiments of the present disclosure.

FIG. 6 shows a more general example of the UL CA system 100 described herein in reference to FIGS. 4 and 5. FIG. 6 shows that in some embodiments, a UL CA system 100 can be configured to operate with first and second antennas 202, 212. A first component 200 of the UL CA system 100 can be configured to operate with the first antenna 202, and a second component 210 can be configured to operate with the second antenna 212.

FIG. 6 further shows that the UL CA system 100 can be configured such that TX and RX functionalities associated with a frequency band can be separated into the two components 200, 210 so as to improve performance. For example, the TX functionality of a second band can be implemented in the second component 210, and the RX functionality of the second band can be implemented in the first component 200. The TX/RX functionalities of the first band can be implemented in the first component 200. As described herein, such a configuration can reduce the impact of an IMD3, resulting from relatively powerful TX signals of the first and second bands, on the RX performance of the second band.

Figure 7:
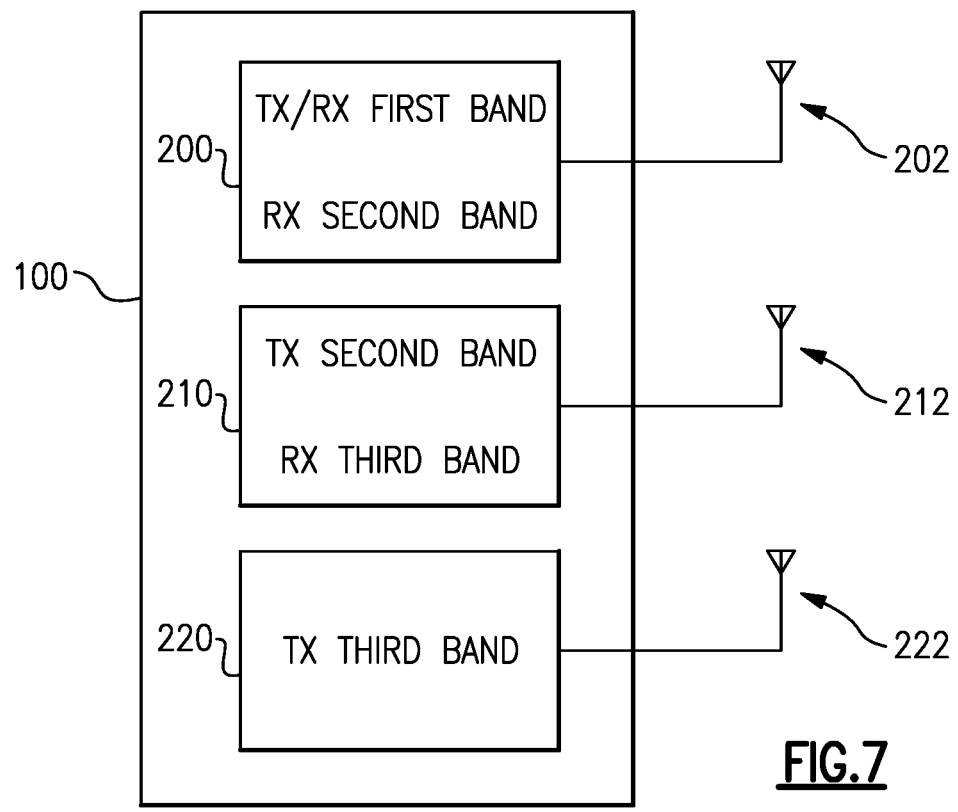
FIG. 7 illustrates an example UL CA system, in accordance with some embodiments of the present disclosure.
Figure 8:
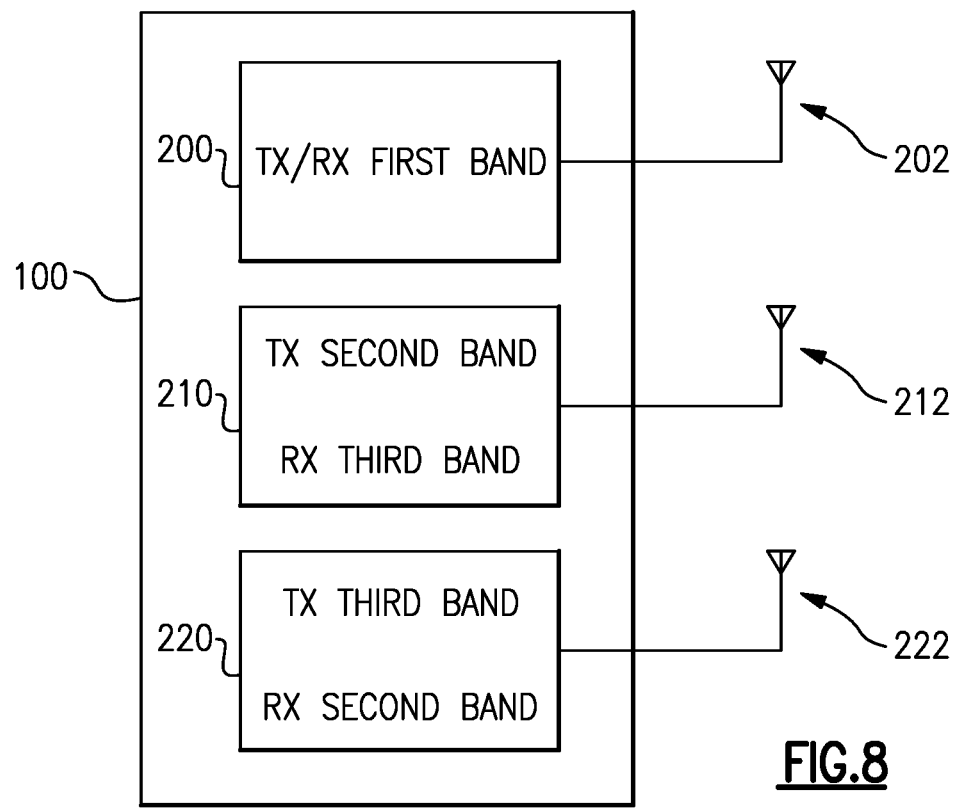
FIG. 8 illustrates an example UL CA system, in accordance with some embodiments of the present disclosure.

The examples of FIGS. 4-6 are described in the context of UL CA of two bands. FIGS. 7 and 8 show that in some embodiments, one or more features of the present disclosure can also be implemented in configurations involving more than two bands. For example, FIG. 7 shows a UL CA system 100 configured to operate with three antennas 202, 212, 222. A first component 200 can be configured to operate with the first antenna 202, a second component 210 can be configured to operate with the second antenna 212, and a third component 220 can be configured to operate with the third antenna 222.

In the example of FIG. 7, the first component 200 is shown to be configured to provide TX/RX functionalities for a first band, as well as RX functionality for a second band, similar to the example of FIG. 6. The second component 210 can be configured to provide TX functionality for the second band similar to the example of FIG. 6, as well as RX functionality for a third band. The third component 220 can be configured to provide TX functionality for the third band.

In another example, FIG. 8 shows a UL CA system 100 configured to operate with three antennas 202, 212, 222. A first component 200 can be configured to operate with the first antenna 202, a second component 210 can be configured to operate with the second antenna 212, and a third component 220 can be configured to operate with the third antenna 222.

In the example of FIG. 8, the first component 200 is shown to be configured to provide TX/RX functionalities for a first band. The second component 210 can be configured to provide TX functionality for a second band, as well as RX functionality for a third band. The third component 220 can be configured to provide TX functionality for the third band, as well as RX functionality for the second band.

It will be understood that other combinations of TX and RX functionalities of the three bands can be implemented. It will also be understood that other numbers of bands and/or numbers of antennas can be utilized.

In various examples described herein, an IMD3 is used as an example of how an IM product can interfere with an RX operation. It will be understood that other IM products and/or harmonics can also cause similar problems for one or more RX operations associated with UL CA systems. Accordingly, it will be understood that one or more features of the present disclosure can also address IM products and/or harmonics other than IMD3s.

In various examples described herein, two or three antennas are utilized. It will be understood that one or more features of the present disclosure can also be implemented with other numbers of antennas. For example, there may be three primary antennas configured to operate in low-band (LB), mid-band (MB), and high-band (HB) modes, and three diversity antennas configured to operate in LB, MB, and HB modes. Some or all of such antennas can facilitate a UL CA system having one or more features as described herein.

In some embodiments, one or more features of the present disclosure can be implemented in architectures in which TX and RX operations are separated to obtain desirable benefits as described herein. For example, a UL CA system can be implemented so as to operate with a TX-dedicated antenna for some or all of TX operations; and some or all of RX operations can be facilitated by a primary RX-dedicated antenna plus a diversity RX-dedicated antenna.

In some examples described herein, two-band UL CA configuration is described as being facilitate by two antennas, three bands by three antennas, etc. In some embodiments, a given antenna can be coupled to a plurality of antenna feeds, such that corresponding bands can operate through the antenna. Accordingly, one or more features of the present disclosure can be implemented with a plurality of antenna feeds as if such antenna feeds are antennas. Such plurality of antenna feeds can be coupled to one or more physical antennas.

In various examples described herein, antenna-to-antenna isolation can be utilized to improve performance when TX and RX operations are separated into different antennas. In some situations, filtering can further provide additional improvement in performance. Accordingly, significant performance can be realized with reduced number of filters. Examples of such performance improvement are described herein in greater detail.

In various examples described herein, problem-causing IM products are described as having frequencies higher than each of the two fundamental frequencies. Such a situation can be appropriate when the RX portions of the two bands are higher than the respective TX portions. In some bands, however, the RX portion may be lower than the TX portion. Accordingly, it will be understood that one or more features of the present disclosure can be implemented to address IM products that have frequencies that are below each of the two fundamental frequencies.

In the example context of an IMD3 being on the higher side of the two TX frequencies, it is noted that the magnitude of IMD3 (e.g., see FIG. 2) can be express as IMD3=2P_Txa+P_Txb−2*OIP3, where OIP3 is an output third order intercept point in dBm, and P_Txa and P_Txb reflect the power of the respective TX frequencies, also in dBm. By separating the victim RX band and the offending TX band as described herein (e.g., FIGS. 4 and 5), one can save an amount of IMD3 approximately equal to the difference between the P_Txa and P_Txb power present at the corresponding antenna ports, which for the example listed in Tables 1A and 1B is approximately 18 dB.

Tables 1A and 1B list various parameters associated with a UL CA IMD analysis for the example configuration of FIG. 5, in which B3 and B1 bands are being carrier aggregated for uplink. It is noted that the various values listed are approximate.

TABLE 1A

| Primary B3 TX Path | PA | Duplexer | ASM | Diplexer | Primary ANT Port | ANT-ANT Isolation | UL CA Ant Port |
|---|---|---|---|---|---|---|---|
| Insertion Loss (dB) | | 2 | 1 | 1 | | | |
| TX Filter Rejection @ Offending B1 TX Freq. (dB) | | 45 | 1 | 1 | | 15 | |
| TX Filter Rejection @ Victim B1 RX Freq. (dB) | | 45 | 1 | 1 | | | |
| IP3 (dBm) | 39 | 70 | 70 | 100 | | | |
| B3 Forward Pout (dBm) | 24 | 22 | 21 | 20 | 20 | | 5 |
| B1 Backward Pout (dBm) | −42 | 3 | 4 | 5 | 5 | | 20 |
| IMD3 (2xB1, B3) (dBm) | −138 | −112 | −111 | −170 | | | |
| Aggregated IMD3 (dBm) | | | | | −109.9 | | −124.9 |

TABLE 1B

| UL CA B1 TX Path | PA | Duplexer | ASM | UL CA ANT Port | ANT-ANT Isolation | Primary Ant Port |
|---|---|---|---|---|---|---|
| Insertion Loss (dB) | | 2 | 1 | | | |
| TX Filter Rejection @ Offending B1 TX Freg. (dB) | | 45 | 1 | | 15 | |
| TX Filter Rejection @ Victim B1 RX Freq. (dB) | | 45 | 1 | | | |
| IP3 (dBm) | 39 | 70 | 70 | | | |
| B1 Forward Pout (dBm) | 23 | 21 | 20 | 20 | | 5 |
| B3 Backward Pout (dBm) | −41 | 4 | 5 | 5 | | 20 |
| IMD3 (2xB1, B3) (dBm) | −73 | −94 | −95 | | | |
| Aggregated IMD3 (dBm) | | | | −92.0 | | −107.0 |

Figure 9:
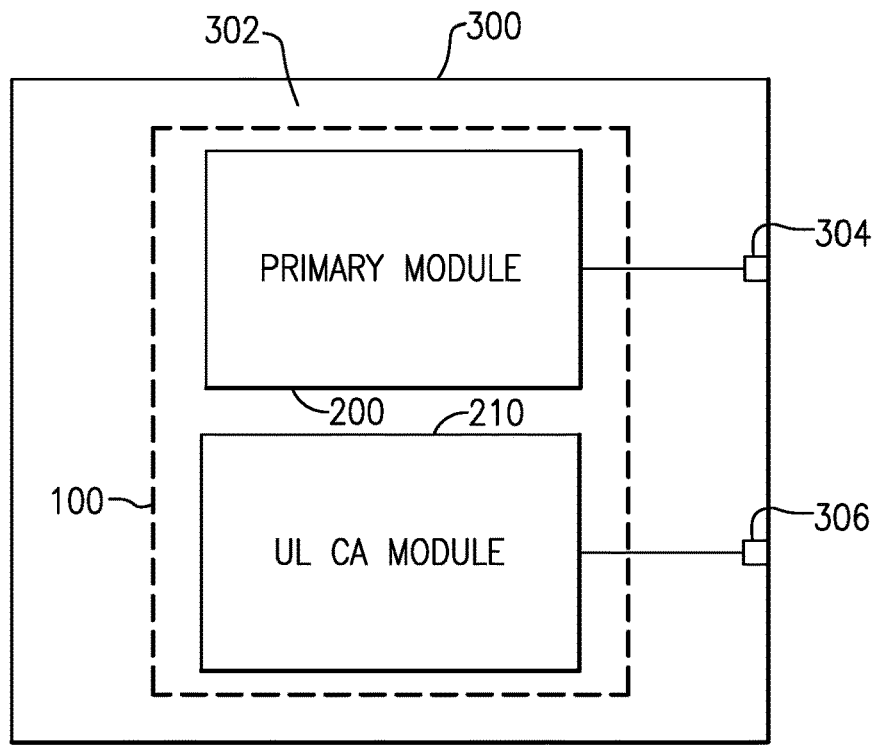
FIG. 9 illustrates an example module, in accordance with some embodiments of the present disclosure.
Figure 10:
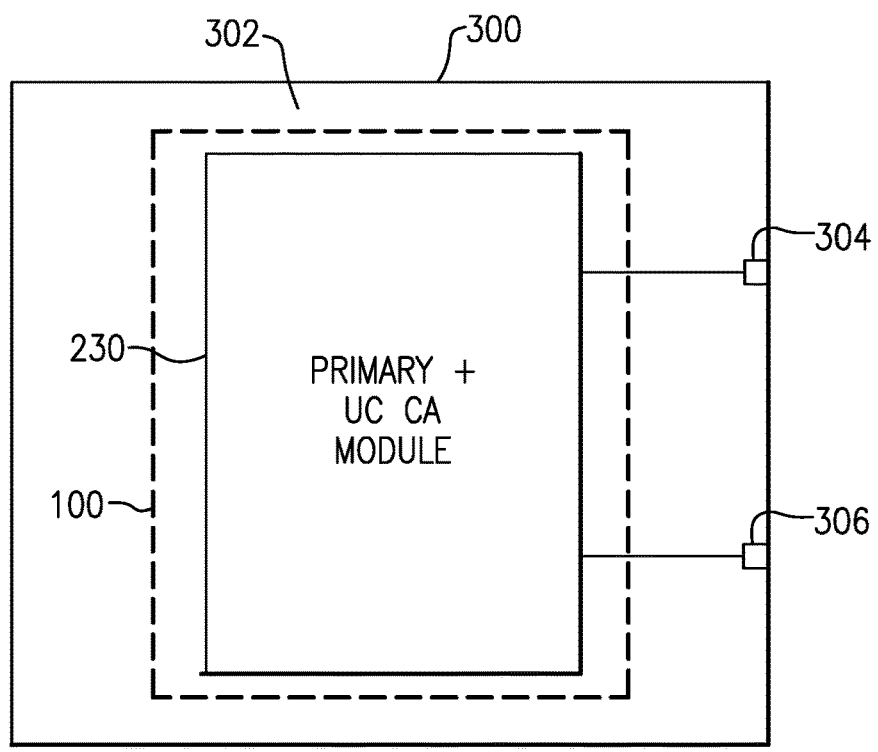
FIG. 10 illustrates an example module, in accordance with some embodiments of the present disclosure.

FIGS. 9 and 10 show that in some embodiments, a UL CA system 100 having one or more features as described herein can be implemented in a packaged module 300. Such a module can include a packaging substrate 302 configured to receive a plurality of components.

In each of FIGS. 9 and 10, the packaged module 300 can include a first antenna port 304 and a second antenna port 306. The first antenna port 304 can be coupled to a first antenna (not shown), and the second antenna port 306 can be coupled to a second antenna (not shown).

In the example of FIG. 9, the first antenna port 304 can be connected to a first module or a component 200 having one or more features as described herein. For example, the first module 200 can be a primary module (110) described in reference to FIG. 5, and the second module 210 can be a UL CA module (140) also described in reference to FIG. 5. It will be understood that each of the first and second modules 200, 210 can be implemented in a single device, as a functional assembly of a number of devices, or any combination thereof.

In the example of FIG. 10, both of the first antenna port 304 and the second antenna port 306 can be connected to a module or a component 230 having one or more features as described herein. For example, such a module (230) can include functionalities associated with a primary module (110) and a UL CA module (140) described in reference to FIG. 5. It will be understood that the module 230 can be implemented in a single device, as a functional assembly of a number of devices, or any combination thereof.

In some implementations, an architecture, device and/or circuit having one or more features described herein can be included in an RF device such as a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless modem configured to support machine type communications, a wireless access point, a wireless base station, etc. Although described in the context of wireless devices, it will be understood that one or more features of the present disclosure can also be implemented in other RF systems such as base stations.

Figure 11:
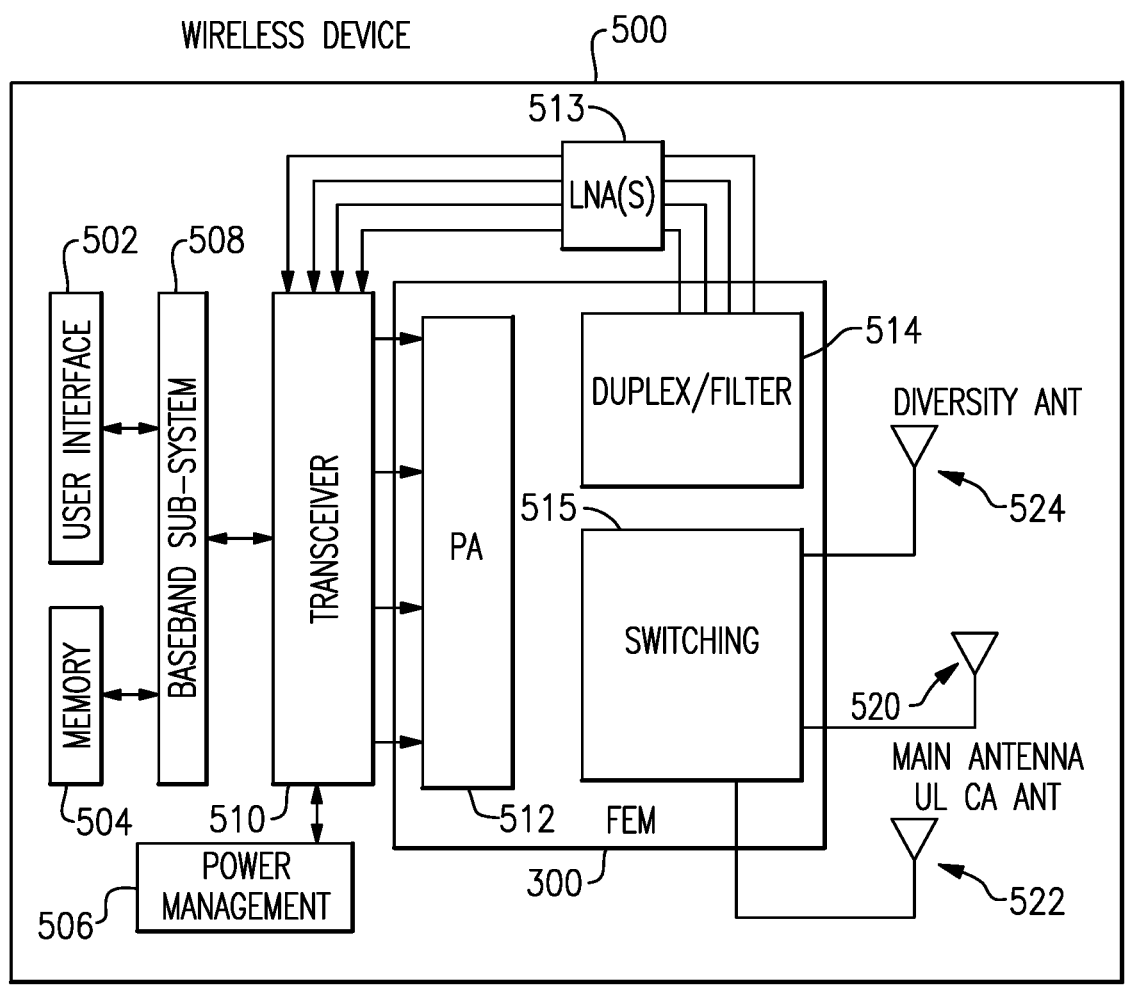
FIG. 11 illustrates an example wireless device, in accordance with some embodiments of the present disclosure.

FIG. 11 depicts an example wireless device 500 having one or more advantageous features described herein. In some embodiments, such advantageous features can be implemented in a front-end (FE) module 300. The FEM 300 is shown to include one or more power amplifiers (PAs) 512, one or more switching modules 515, and one or more duplexers and/or filters 514.

In the example of FIG. 11, the switching module 515 is shown to be coupled to three example antennas. For example, a main antenna (also referred to herein as a primary antenna) 520, a diversity antenna 524, and a UL CA antenna 522 can be provided. It will be understood that other numbers of antennas and/or antenna feeds can be implemented to facilitate one or more features of the present disclosure.

The PAs 512 can receive their respective RF signals from a transceiver 510 that can be configured and operated to generate RF signals to be amplified and transmitted, and to process received signals. The transceiver 510 is shown to interact with a baseband sub-system 508 that is configured to provide conversion between data and/or voice signals suitable for a user and RF signals suitable for the transceiver 510. The transceiver 510 is also shown to be connected to a power management component 506 that is configured to manage power for the operation of the wireless device 500. Such power management can also control operations of the baseband sub-system 508 and other components of the wireless device 500.

The baseband sub-system 508 is shown to be connected to a user interface 502 to facilitate various input and output of voice and/or data provided to and received from the user. The baseband sub-system 508 can also be connected to a memory 504 that is configured to store data and/or instructions to facilitate the operation of the wireless device, and/or to provide storage of information for the user.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

One or more features of the present disclosure can be implemented with various cellular frequency bands as described herein. Examples of such bands are listed in Table 2. It will be understood that at least some of the bands can be divided into sub-bands. It will also be understood that one or more features of the present disclosure can be implemented with frequency ranges that do not have designations such as the examples of Table 2.

TABLE 2

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for performing uplink (UL) carrier aggregation (CA), the method comprising:
providing a first antenna port and a second antenna port;
processing, by a first radio-frequency circuit, a first transmit signal associated with a first band and a first receive signal associated with the first band to and from the first antenna port, respectively, the first radio-frequency circuit including a duplexer to route the first transmit signal and the first receive signal, the first radio-frequency circuit including a first transmit path to process the first transmit signal, the first transmit path including a first switchable path between the duplexer and the first antenna port, the first radio-frequency circuit including a first receive path to process the first receive signal, the first receive path including a second switchable path between the duplexer and the first antenna port;

routing, by the first radio-frequency circuit, a second receive signal associated with a second band from the first antenna port, the first radio-frequency circuit including a filter to route the second receive signal, the first radio-frequency circuit including a second receive path to process the second receive signal, the second receive path including a third switchable path between the first antenna port and the filter; and routing, by a second radio-frequency circuit, a second transmit signal associated with the second band to the second antenna port to provide UL CA capability between the first and second transmit signals.

2. The method of claim 1 wherein the first and second receive signals being separated by the first and second radio-frequency circuits reduces an effect of an intermodulation distortion (IMD) on the second receive signal.

3. The method of claim 2 wherein the IMD is a third-order IMD (IMD3).

4. The method of claim 3 wherein the IMD3 results from intermodulation of the first and second transmit signals.

5. The method of claim 4 wherein the second transmit signal has a frequency that is higher than the first transmit signal.

6. The method of claim 5 wherein the IMD3 is at a frequency higher than the frequency of the second transmit signal.

7. The method of claim 5 wherein the first transmit signal and the first receive signal are parts of a first cellular band, and the second transmit signal and the second receive signal are parts of a second cellular band.

8. The method of claim 7 wherein the first cellular band includes B3.

9. The method 1 of claim 8 wherein the second cellular band includes B1.

10. The method of claim 1 wherein the first transmit path includes a power amplifier, the duplexer coupled to an output of the power amplifier, and the first switchable path between the duplexer and the first antenna port.

11. The method of claim 10 wherein the first receive path configured to process the first receive signal includes the second switchable path between the first antenna port and the duplexer of the first transmit path.

12. The method of claim 11 wherein the second switchable path of the first receive path includes the first switchable path of the first transmit path.

13. The method of claim 12 wherein the second switchable path of the first receive path and the third switchable path of the second receive path include respective switches implemented in an antenna switch module.

14. The method of claim 11 wherein the second radio-frequency circuit includes a second transmit path having a power amplifier, a filter coupled to an output of the power amplifier, and a fourth switchable path between the filter and the second antenna port.

15. The method of claim 14 wherein the fourth switchable path of the second transmit path includes a switch in an antenna switch module.

16. A wireless device comprising:
a transceiver configured to process radio-frequency signals;
a first antenna and a second antenna, each in communication with the transceiver; and
an uplink (UL) carrier aggregation (CA) system implemented between the transceiver and the first and second antennas, the UL CA system including a first radio-frequency circuit configured to route a first transmit signal associated with a first band and a first receive signal associated with the first band to and from the first antenna, respectively, the first radio-frequency circuit including a duplexer to route the first transmit signal and the first receive signal, the first radio-frequency circuit further configured to route a second receive signal associated with a second band from the first antenna, the first radio-frequency circuit including a filter to route the second receive signal, the first radio-frequency circuit including a first transmit path to process the first transmit signal, the first transmit path including a first switchable path between the duplexer and the first antenna, the first radio-frequency circuit including a first receive path to process the first receive signal, the first receive path including a second switchable path between the duplexer and the first antenna, the first radio-frequency circuit including a second receive path to process the second receive signal, the second receive path including a third switchable path between the first antenna and the filter, the UL CA system further including a second radio-frequency circuit configured to route a second transmit signal associated with the second band to the second antenna to provide UL CA capability between the first and second transmit signals.

17. The wireless device of claim 16 wherein the first antenna is a primary antenna and the second antenna is a UL CA antenna.

18. The wireless device of claim 17 wherein the wireless device is a cellular phone.

19. The wireless device of claim 18 wherein the cellular phone is capable of operating in B3 and B1 bands.

* * * * *